United States Patent [19]

Nishioka

[11] Patent Number: 5,404,548
[45] Date of Patent: Apr. 4, 1995

[54] DATA TRANSFER CONTROL SYSTEM TRANSFERRING COMMAND DATA AND STATUS WITH IDENTIFYING CODE FOR THE TYPE OF INFORMATION

[75] Inventor: Shouji Nishioka, Tokyo, Japan

[73] Assignee: Kabushiki Kaisha Toshiba, Kawasaki, Japan

[21] Appl. No.: 687,024

[22] Filed: Apr. 18, 1991

[30] Foreign Application Priority Data

Apr. 19, 1990 [JP] Japan .................... 2-103536

[51] Int. Cl.6 ............................................ G06F 13/00
[52] U.S. Cl. .................... 395/800; 395/275;
395/325; 395/375; 395/425
[58] Field of Search ............... 395/325, 250, 271, 275, 395/425, 400; 364/134; 370/85.5

[56] References Cited

U.S. PATENT DOCUMENTS

| | | | |
|---|---|---|---|
| 3,972,023 | 7/1976 | Bodner et al. | 395/275 |
| 4,112,490 | 9/1978 | Pohlman et al. | 395/325 |
| 4,138,732 | 2/1979 | Suzuki et al. | 395/275 |
| 4,453,211 | 6/1984 | Askinazi et al. | 395/500 |
| 4,471,425 | 9/1984 | Yamaguchi et al. | 395/325 |
| 4,622,630 | 11/1986 | Vora et al. | 364/134 |
| 4,646,230 | 2/1987 | Eguchi | 395/400 |
| 4,754,399 | 6/1988 | Yamamoto et al. | 395/250 |
| 4,763,249 | 8/1988 | Bomba et al. | 395/325 |
| 4,800,491 | 1/1989 | Hardy | 395/425 |
| 4,805,137 | 2/1989 | Grant et al. | 395/325 |
| 4,845,709 | 7/1989 | Matsumoto et al. | 370/85.5 |
| 4,942,515 | 7/1990 | Marzucco et al. | 395/275 |
| 4,965,801 | 10/1990 | Dulac | 395/271 |
| 5,233,692 | 8/1993 | Gajjar et al. | 395/325 |

OTHER PUBLICATIONS

Steven N. Friedman—Intelligent IBM-PC Compatible Boards Support a Variety of MIL-STD-1553 Applications.

*Primary Examiner*—Alyssa H. Bowler
*Assistant Examiner*—Dan Fiul
*Attorney, Agent, or Firm*—Cushman, Darby & Cushman

[57] ABSTRACT

An I/O buffer arranged in an I/O controller for controlling an I/O unit is constituted by a transmission FIFO buffer and a reception FIFO buffer. Each of the transmission and reception FIFO buffers is constituted by paired transfer data storage areas and ID information storage areas. ID information represents the type of transfer data. ID information is generated by the ID information generator and is stored in a corresponding area together with transfer data. Command data or write data output from the transmission buffer is supplied to the I/O unit together with its ID information. Data read out from the I/O unit is sequentially stored in the reception FIFO buffer together with ID information. On the basis of the ID information, the I/O unit determines whether the transferred information is a command or data. On the basis of the ID information, the I/O controller determines whether the transferred information is reception data or a status.

12 Claims, 4 Drawing Sheets

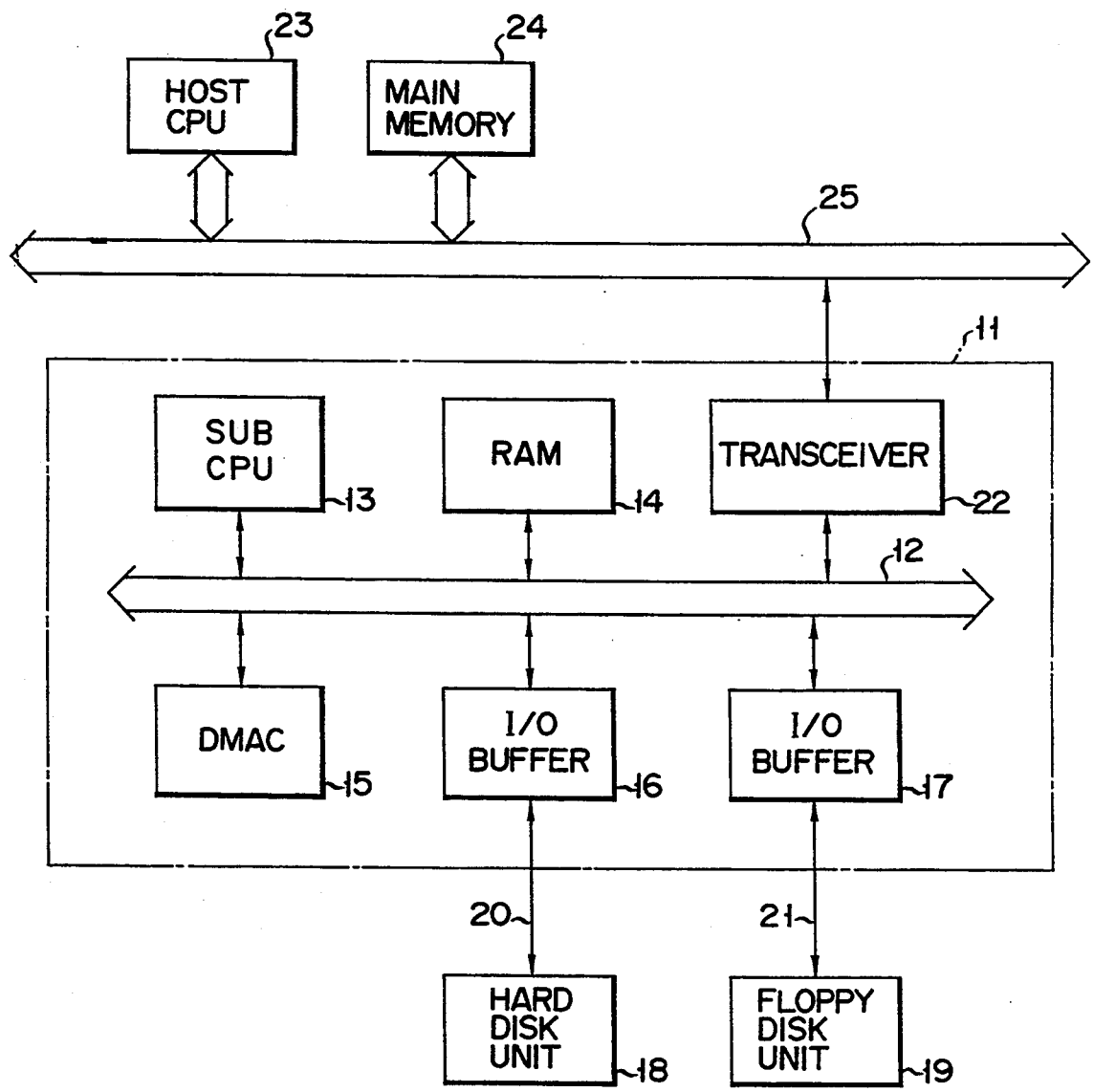
F I G. 1

CONTROL BIT

| BIT | CONTENT | TRANSFER DIRECTION |
|---|---|---|
| 0 0 | DATA OUT | I ⟶ T |
| 0 1 | DATA IN | I ⟵ T |
| 1 0 | COMMAND | I ⟶ T |
| 1 1 | STATUS | I ⟵ T |

F I G. 3

| COMMAND TYPE | OP CODE |
|---|---|
| LOGICAL UNIT NO. | LOGICAL ADDRESS (1) |
| LOGICAL ADDRESS (2) ||
| LOGICAL ADDRESS (3) ||
| TRANSFER LENGTH ||
| CONTROL BYTE ||

F I G. 4

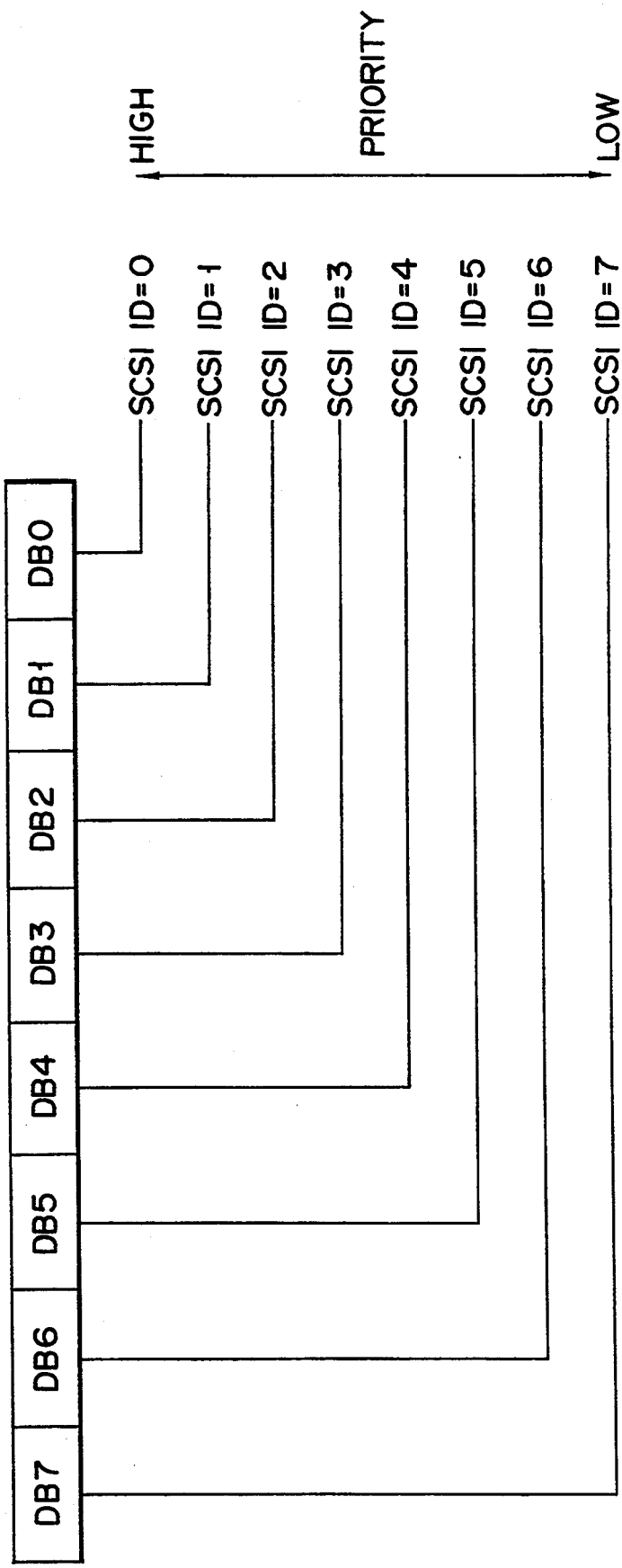
F I G. 5

DATA TRANSFER CONTROL SYSTEM TRANSFERRING COMMAND DATA AND STATUS WITH IDENTIFYING CODE FOR THE TYPE OF INFORMATION

BACKGROUND OF THE INVENTION

1. Field of the Invention

The present invention relates a data transfer control system for executing command transfer, data transfer, and status transfer between modules on the same bus and, more particularly, to a data transfer control system in an input/output controller.

2. Description of the Related Art

An input/output (I/O) controller is generally arranged between an I/O unit, e.g., a disk unit, and a host computer so as to control data transfer therebetween. The I/O controller exchanges transfer information, such as commands, data, and statuses, with the I/O unit. In this case, these pieces of information, such as commands, data, and statuses, are transferred between the I/O controller and the I/O unit through the same bus.

For this reason, in a conventional system, in order to discriminate command transfer, data transfer, and status transfer from each other, a CPU (sub-CPU) in the I/O controller must recognize and control transfer contents every time each piece of information is transferred. When, for example, data is to be written in the I/O unit, the CPU in the I/O controller inquires of the I/O unit whether a command can be received. If the I/O unit is busy, the sub-CPU is kept in a wait state during this period. Upon reception of a response signal, from the I/O unit, representing that the command can be received, the sub-CPU transfers the first byte of the command. The sub-CPU then inquires of the I/O unit whether the second byte of the command can be received. Similarly, if the I/O unit is busy, the sub-CPU is kept in a wait state during this period. Upon reception of a response signal, from the I/O unit, which represents that the second byte of the command can be received, the sub-CPU transfers the second byte of the command to the I/O unit. Subsequently, the sub-CPU transfers the command consisting of a plurality of bytes to the I/O unit in units of bytes in the same procedure as described above. Upon completion of the command transfer, the sub-CPU inquires of the I/O unit whether write data can be received. Upon reception of a response signal representing that the write data can be received, the sub-CPU starts a DMAC (Direct Memory Access Controller) to transfer the write data to the I/O unit. In addition, when status information of the I/O unit is to be read, the sub-CPU must follow the above-described procedure. That is, the sub-CPU in the I/O controller is required to perform cumbersome transfer control. Especially, when a single I/O controller is to control a plurality of different types of I/O units, a single sub-CPU must control command transfer, data transfer, and status transfer with respect to each of the different types of units. That is, the sub-CPU is required to perform data transfer control in accordance with the capacity of each I/O unit. For this reason, the performance of the I/O controller is deteriorated, and it is difficult to efficiently operate all the I/O units.

SUMMARY OF THE INVENTION

It is an object of the present invention to provide a data transfer control system which can perform data transfer while discriminating command transfer, data transfer, and status transfer from each other, without intervention by a sub-CPU in each operation, and can efficiently operate a plurality of I/O units.

In order to achieve the above object, according to the present invention, there is provided a data transfer control system in a system in which command transfer, data transfer, and status transfer between a source module and a destination module are performed on the same bus, comprising memory means constituted by a first area group for storing information including a command, data, and a status which are transferred between the modules, and a second area group for storing ID information for identifying a type of the information including the command, the data, and the status stored in the first area group, means for generating ID information to be set in the second area group, and means for sequentially outputting the information stored in the first area group and the corresponding ID information in the second area group to the modules.

According to the data transfer control system of the present invention, transfer data and an ID flag representing that the transfer data is a command, write data, read data, or a status are simultaneously set in a FIFO buffer. Therefore, a reception side module can recognize the type of transfer data, i.e., a command, write data, read data, or a status, on the basis of an ID flag output from the FIFO buffer. On the I/O controller side, once an ID flag is set in the FIFO buffer, 10 data transfer can be performed while command transfer, data transfer, and status transfer are discriminated, without intervention of a sub-CPU in every operation, thereby improving the performance of the I/O controller.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1 is a block diagram showing a data transfer control system according to an embodiment of the present invention;

FIG. 3 is a view showing the contents of control bits output from a command ID signal generator in FIG. 2;

FIG. 4 is a view showing a format of a command stored in a transmission buffer; and FIG. 5 is a view showing the assignment of the ID bits of units to be connected to an SCSI bus and the priorities of the units.

DETAILED DESCRIPTION OF THE PREFERRED EMBODIMENTS

Figure 2:
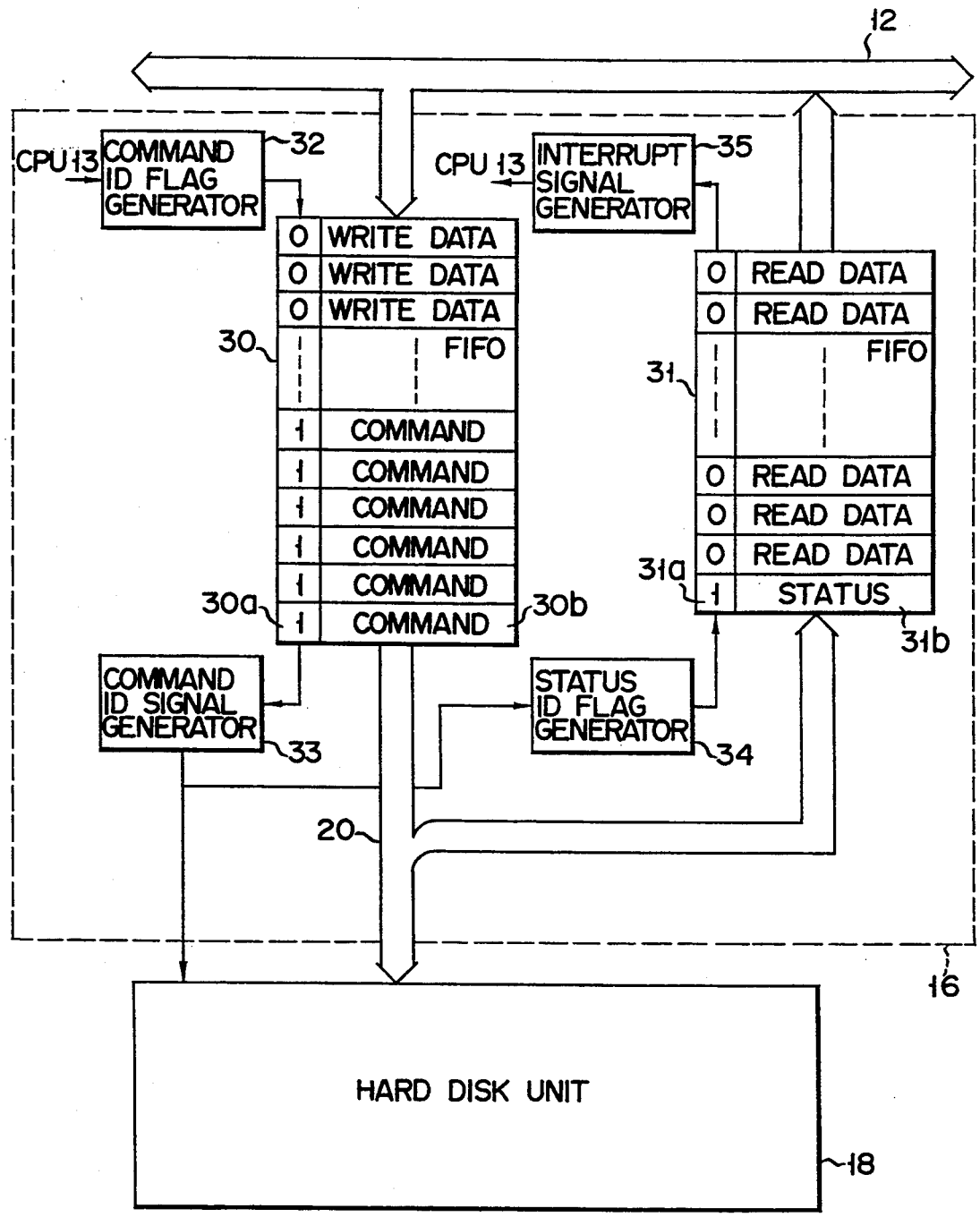
FIG. 2 is a block diagram showing a detailed arrangement of an I/O buffer in FIG. 1.

FIG. 1 is a block diagram showing a data transfer control system according to an embodiment of the present invention. As shown in FIG. 1, a host CPU 23, a main memory 24, and an I/O controller 11 are connected to each other through a system bus 25. In addition, modules to be controlled, e.g., a hard disk unit 18 and a floppy disk unit 19, are connected to the I/O controller 11. For example, in response to a write command from the host CPU 23, the I/O controller 11 reads out write data from the main memory 24 and writes the read data in the hard disk unit 18 or the floppy disk unit 19. In response to a read command from the host CPU 23, the I/O controller 11 reads out data from a corresponding disk unit and sets the read data in the main memory 24. In response to a status read request from the host CPU 23, the I/O controller 11 reads out status information from a corresponding disk unit and supplies the read information to the host CPU 23.

The I/O controller 11 comprises a sub-CPU 13, a random access memory (RAM) 14, a transceiver 22, a direct memory access controller (DMAC) 15, and I/O buffers 16 and 17. These components are connected to each other through a local bus 12. In addition, the I/O buffers 16 and 17 are respectively connected to the hard disk unit 18 and the floppy disk unit 19. The sub-CPU 13 controls the overall I/O controller 11 to perform data transfer control with respect to the hard disk unit 18 and the floppy disk unit 19. The RAM 14 stores data transferred between the host CPU 23 and the I/O controller 11, and between the I/O controller 11, the hard disk unit 18, and the floppy disk unit 19. The DMAC 15 receives a transfer start address and transfer byte length data from the sub-CPU 13, and performs data transfer between the main memory 24 and the RAM 14, and between the RAM 14 and the hard disk unit 18 or the floppy disk unit 19, in response to a start command from the sub-CPU 13. The transceiver 22 performs data transfer between the host CPU 23 and the I/O controller 11.

Each of the I/O buffers 16 and 17 is constituted by a first-in first-out (FIFO) buffer. The I/O buffer 16 is used for data transfer between the I/O controller 11 and the hard disk unit 18. The I/O buffer 17 is used for data transfer between the I/O controller 11 and the floppy disk unit 19. Note that the interface between the I/O controller 11, the hard disk unit 18, and the floppy disk unit 19 is based on, e.g., the specifications of an SCSI (Small Computer System Interface) whose standards are defined by Technical Committee ANSIX3T9.2 of ANSI (American National Standard Institute).

FIG. 2 is a block diagram showing a detailed arrangement of the I/O buffer 16 in FIG. 1. Note that since the I/O buffer 17 has the same arrangement as that of the I/O buffer 16, a description will be made with reference to only the I/O buffer 16. As shown in FIG. 2, the I/O buffer 16 includes a transmission FIFO buffer 30 and a reception FIFO buffer 31. Each of these FIFO buffers 30 and 31 is constituted by, e.g., 16 Kbytes or 64 Kbytes. Commands and write data from the host CPU 23 are stored in the transmission buffer 30 in the transfer order. Read data and status data from the hard disk unit 18 are stored in the reception buffer 31 in the transfer order. A command to be stored in the transmission buffer 30 consists of, e.g., 6 bytes. More specifically, as shown in FIG. 4, the first byte is an operation code representing the contents of the command. The first 3 bits of this operation code represent a command type, i.e., whether the command consists of 6 or 10 bytes or another number of bytes. A 3-byte logical address follows the operation code. The first 3 bits of this logical address represent a logical unit number. In this embodiment, a maximum of eight disk units can be connected to the I/O controller by daisy chain. More specifically, as shown in FIG. 5, SCSI ID bits for identifying eight SCSI devices are assigned to the bits of an SCSI bus, which is constituted by 8 bits, in a one-to-one correspondence. These SCSI ID bits have their own priorities. SCSI ID=7 represents the highest priority. The priority level is lowered toward SCSI ID=0. The fifth byte of the command represents a data transfer length. The sixth byte represents a control byte. The control byte includes information, e.g., retry information.

The transmission buffer 30 includes 1-bit areas 30a, each for storing ID information representing the data type, i.e., a command or data, of the contents of a corresponding one of areas 30b, in which a command or data is stored. In this embodiment, "1" is set in each area 30a, when a command is stored, whereas "0" is set, when data is stored. A command ID flag generator 32 is connected to the transmission buffer 30. The command ID flag generator 32 is constituted by, e.g., a flip-flop, and outputs "1" or "0" data set by the sub-CPU 13 to the transmission buffer 30. If data received from the host CPU 23 through the transceiver 22 is a command, the sub-CPU 13 sets "1" in the command ID flag generator 32. If it is data, the sub-CPU 13 sets "0" in the command ID flag generator 32. Consequently, a command or write data is stored in each area 30b of the transmission buffer 30 together with ID information representing its data type.

In addition, a command ID signal generator 33 is connected to the transmission buffer 30. The command ID signal generator 33 is constituted by, e.g., a decoder, receives 1-bit command ID flag information from the transmission buffer 30, and outputs 2-bit control bit data to the hard disk unit 18. This 2-bit control bit data represents a command, a status, or a data transfer direction. More specifically, as shown in FIG. 3, when the control bit data is "00", it represents a data output operation, and that data is transferred from the I/O controller 11 to the hard disk unit 18. Similarly, control bit data "01" represents a data input operation, and that data is transferred from the hard disk unit 18 to the I/O controller 11. Control bit data "10" represents a command and that data is transferred from the I/O controller 11 to the hard disk unit 18. Control bit data "11" represents a status and that data is transferred from the hard disk unit 18 to the I/O controller 11. Referring to FIG. 3, reference symbol "I" denotes an initiator; and "T", a target. In this embodiment, "I" and "T" respectively represent the I/O controller 11 and the hard disk unit 18.

Read data and status data transferred from the hard disk unit 18 are respectively stored in areas 31b of the reception buffer 31 in the transfer order. In addition, the reception buffer 31 includes areas 31a, each for storing 1-bit status ID information representing that data stored in a corresponding one of the areas 31b is read data or status data. In this case, if information supplied from the hard disk unit 18 is status data, "1" is set, and if it is read data, "0" is set. A status ID flag generator 34 is connected to the reception buffer 31. The status ID flag generator 34 is constituted by, e.g., an encoder. The status ID flag generator 34 receives 2-bit control bit data from the hard disk unit 18. If the control bit is data "11", "1" data is output from the generator 34 to the reception buffer 31, otherwise "0" data is output. Consequently, status or read data is stored in each area 31b of the reception buffer 31 together with status ID information representing its data type in a corresponding area 31a. In addition, an interrupt signal generator 35 is connected to the reception buffer 31. The interrupt signal generator 35 is constituted by, e.g., a flip-flop 35 and is set by status ID information "1" representing status data. An interruption is generated in the sub-CPU 13 by a "1" signal output from the interrupt signal generator 35. In response to an interrupt signal, the sub-CPU 13 reads out status data from the reception buffer 31. This status data is 1-byte data representing whether some kind of error has occurred in, e.g., the hard disk unit 18. If the status data indicates some kind of error, the sub-CPU 13 outputs a command for requesting more detailed error information to the hard disk unit 18 side. In response to the command, the hard disk unit 18 side outputs detailed error information to the sub-CPU 13 side.

An operation of an embodiment, of the present invention, having the above-described arrangement will be described below.

An operation of the data transfer control system in relation to the I/O controller 11 will be described first. Assume that the host CPU 23 writes data in the hard disk unit 18. In this case, the host CPU 23 outputs a 6-byte command representing a data write operation with respect to the hard disk unit 18 and write data to the I/O controller 11 through the system bus 25. The sub-CPU 13 of the I/O controller 11 receives the 6-byte command and the write data through the transceiver 22 and temporarily stores them in the RAM 14. The sub-CPU 13 sequentially stores the command data, which is stored in the RAM 14, in the transmission FIFO buffer 30. At this time, the sub-CPU 13 sets the command ID flag generator 32. As a result, the respective command bytes are sequentially stored in the transmission FIFO buffer 30 together with command ID flag information "1". When the 6-byte command is completely stored, the sub-CPU 13 resets the command ID flag generator 32. At the same time, in response to the 6-byte command data, the sub-CPU 13 supplies the start address and data length of the write data stored in the RAM 14, as parameters, to the DMAC 15, thus starting the DMAC 15. At this point of time, the sub-CPU 13 is released from the data transfer control with respect to the hard disk unit 18. Therefore, the sub-CPU 13 can be used for data transfer control with respect to the floppy disk unit 19, as needed. In response to the start signal from the CPU 13, the DMAC 15 reads out the write data from the RAM 14 and sequentially writes it in the transmission buffer 30. At this time, command ID flag information "0" is output to each area of the transmission FIFO buffer 30 so as to be stored in correspondence with the write data when the transmission buffer 30 is filled with data, the DMAC 15 waits until an empty area appears. When the write data is sequentially written in the transmission FIFO buffer 30 in this manner, a command (the first byte of a 6-type command) stored at a given timing is output to the hard disk unit 18. At this time, the command ID signal generator 33 receives 1-bit command ID flag information output from the transmission buffer 30 and outputs 2-bit control information to the hard disk unit 18. In this case, the command ID signal generator 33 supplies control bit data "10" representing a command to the hard disk unit 18. If this command is not received by the hard disk unit 18 within a predetermined period of time, i.e., if status information is not supplied from the hard disk unit 18 before a lapse of a predetermined period of time, the sub-CPU 13 determines that the output data is not received by the hard disk unit 18. As a result, the sub-CPU 13 cancels the data set in the transmission buffer 30 and repeats the same procedure from the beginning.

If the hard disk unit 18 is in a ready state, the unit 18 sequentially receives the 6-byte command. As a result, the hard disk unit 18 recognizes that the command is a write command, and sequentially receives the write data. At this time, the command ID signal generator 33 supplies control bit data "00" to the hard disk unit 18. The above-described operation is repeated until data having a data transfer length designated by the sub-CPU 13 is set in the transmission buffer 30 by the DMAC 15. When the data having the designated data transfer length is completely set in the transmission buffer 30, the DMAC 15 causes an interruption in the sub-CPU 13. At this time, the hard disk unit 18 outputs status data representing a proper or improper write operation to the reception FIFO buffer 31. In response to the interrupt signal from the DMAC 15, the sub-CPU 13 reads out status information in the reception buffer 31. At this time, if no status information is supplied to the hard disk unit 18, an error is determined. Upon reception of status information representing that no error has occurred, the sub-CPU 13 completes the write operation.

A read operation of data from the hard disk unit 18 will be described below. Similar to the write operation, the host CPU 23 outputs a read command (6 bytes) to the I/O controller 11 through the system bus 25. Consequently, the sub-CPU 13 receives the 6-byte command through the transceiver 22 and sequentially stores it in the transmission buffer 30 in the same manner as in the write operation. The read command is then supplied to the hard disk unit 18. In addition, the sub-CPU 13 supplies the start address and data length of data to be stored in the RAM 14, as parameters, to the DMAC 15, thus starting the DMAC 15. In response to the read command, the hard disk unit 18 reads out data from a location corresponding to the designated logical address, and sequentially stores it in the reception buffer 31 through a bus 20. At this time, the hard disk unit 18 outputs 2-bit control bit data "01" to the status ID flag generator 34. The status ID flag generator 34 encodes the 2-bit control bit data "01" to output bit information "0" to the reception buffer 31. As a result, the read data is sequentially stored in the reception buffer 31 together with the ID information "0". The DMAC 15 sequentially reads out the read data from the reception buffer 31 and transfers it to the RAM 14. Finally, the hard disk unit 18 outputs status data representing the end of the read operation. At this time, the hard disk unit 18 outputs control bit data "11" to the status ID flag generator 34. The status ID flag generator 34 then encodes the control bit data to output ID information "1" to the reception buffer 31. Therefore, the status information is stored in the reception buffer 31 together with the ID information "1". When the ID information "1" is output from the reception buffer 31, the interrupt signal generator 35 outputs an interrupt signal to the sub-CPU 13. In response to the interrupt signal from the interrupt signal generator 35, the sub-CPU 13 reads out status information from the reception buffer 31. If no error is detected, the sub-CPU 13 outputs the read data stored in the RAM 14 to the main memory 24 through the system bus 25.

As described above, in this embodiment, since transfer information and an ID flag are simultaneously set in the FIFO buffer, the transfer information is identified as a command, data, or a status by the ID flag information output from the FIFO buffer. With this arrangement, once an ID flag is set, data transfer can be performed while command transfer, data transfer, and status transfer are discriminated, without intervention of the sub-CPU 13 in every operation. This leads to a great reduction in load of the sub-CPU 13. Therefore, a plurality of I/O units can be efficiently controlled by a single I/O controller.

In the above-described embodiment, an I/O controller for controlling disk units is exemplified. However, the data transfer control system of the present invention is not limited to the above-described I/O controller. For example, the present invention can be applied to every system designed to execute command transfer, data transfer, and status transfer between modules on the same bus. Furthermore, in the above-described embodiment, the SCSI bus is used as a bus. However, the present invention can be applied to systems which use other buses such as Ethernet or RS232C buses.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A data transfer control system for a system in which a command, data, and a status can be transferred between a source module and a destination module on a common bus, said data transfer control system comprising:

memory means for storing transfer information and identification information, said transfer information including one of said command and said data which is being transferred between said source module and said destination module, said identification information identifying a type of a corresponding said transfer information, and wherein said memory means includes a transmission first-in first-out buffer which comprises:
a first area group for storing said transfer information; and
a second area group for storing said identification information;
identification data generating means, connected to said memory means, for generating said identification information and for outputting said identification information to said second area group;
output means for sequentially outputting said transfer information to said destination module and for sequentially outputting said corresponding identification information; and
control data generating means, connected to said memory means, for generating control data in accordance with said identification information output by said output means and for outputting said control data to said destination module, wherein said control data includes data transfer direction information.

2. The system according claim 1, wherein said transmission first-in first-out buffer comprises a first-in first-out register.

3. A data transfer control system for a system in which a command, data, and a status can be transferred between a source module and a destination module on a common bus, said data transfer control system comprising:

memory means for storing transfer information and identification information, said transfer information including one of said data and said status which is being transferred between said source module and said destination module, said identification information identifying a type of a corresponding said transfer information, and wherein said memory means includes a reception first-in first-out buffer which comprises:
a first area group for storing said transfer information; and
a second area group for storing said identification information;
means, connected between said destination module and said memory means, for generating said identification information in accordance with control information which is outputted from said destination module, and for storing said identification information in said second area group;
output means for sequentially outputting said transfer information to said source module and for sequentially outputting said corresponding identification information; and
interrupt signal generating means, connected to said second area group, for determining, based upon said corresponding identification information output by said output means, when said transfer information output by said output means includes said status, and for generating an interrupt signal in accordance with said determination.

4. The system according to claim 3, further comprising a central processing unit for reading out said status in accordance with said interrupt signal.

5. The system according to claim 4, wherein said output means includes a direct memory access controller for translating said transfer information to a second memory in response to a start address and data length information supplied from said central processing unit.

6. The system according to claim 1, wherein said destination module comprises an I/O unit, and said source module comprises an I/O controller for controlling said I/O unit.

7. The system according to claim 1, wherein said source module and said destination module are connected to a SCSI interface.

8. The system according to claim 1, wherein said identification data generating means further comprises a decoder.

9. The system according to claim 1, further comprising:
a second memory for storing said transfer information;
a central processing unit for causing said transfer information to be stored in said second memory;
a direct memory access controller for transferring said transfer information from said second memory to said first area in response to a start address and data length information supplied from said central processing unit.

10. The system according to claim 3, wherein said destination module includes an I/O unit and said source module includes an I/O controller for controlling said I/O unit.

11. The system according to claim 3, wherein said source module and said destination module are connected to each other by a SCSI interface.

12. The system according to claim 3, wherein said generating means includes an encoder.

* * * * *